United States Patent [19]
Fischer et al.

[11] Patent Number: 5,486,374
[45] Date of Patent: Jan. 23, 1996

[54] MEAT EMULSON PRODUCT

[75] Inventors: Craig D. Fischer, deceased, late of Manalapan, by Kathy S. Fischer, executrix; Dennis J. Breitbart, Kendall Park; Arnold I. Epstein, Cliffside Park; Dale D. Zabel, Basking Ridge, all of N.J.

[73] Assignee: Thomas J. Lipton Co., Division of Conopco, Inc., Englewood Cliffs, N.J.

[21] Appl. No.: 329,551

[22] Filed: Oct. 25, 1994

Related U.S. Application Data

[62] Division of Ser. No. 159,989, Nov. 30, 1993, Pat. No. 5,409,730.

[51] Int. Cl.⁶ .................................................... A23L 1/317
[52] U.S. Cl. ........................................ 426/574; 426/646
[58] Field of Search ................................ 426/104, 105, 426/574, 646, 802, 804

[56] References Cited

U.S. PATENT DOCUMENTS

| | | | |
|---|---|---|---|
| 3,023,104 | 2/1962 | Battista | 426/804 X |
| 4,089,981 | 5/1978 | Richardson | 426/104 |
| 4,132,810 | 1/1979 | Knutson | 426/104 |
| 4,143,164 | 3/1979 | Shanbhag et al. | 426/104 |
| 4,376,134 | 3/1983 | Kumar | 426/104 X |
| 4,504,515 | 3/1985 | Hohenester et al. | 426/641 |
| 4,844,922 | 7/1989 | Uemura et al. | 426/104 |
| 4,904,496 | 2/1990 | Izzo et al. | 426/105 X |
| 4,943,445 | 7/1990 | Norton et al. | 426/804 X |
| 5,151,290 | 9/1992 | Norton et al. | 426/804 X |
| 5,213,829 | 5/1993 | Cox et al. | 426/104 |
| 5,294,456 | 3/1994 | Jenkins et al. | 426/574 X |

*Primary Examiner*—Arthur L. Corbin
*Attorney, Agent, or Firm*—James J. Farrell

[57] ABSTRACT

A ground or chopped meat product containing a continuous phase of heat settable meat emulsion and dispersed therein a discontinuous phase of a water-in-oil emulsion. The discontinuous phase itself has a continuous phase of fat and an aqueous gelling solution as a discontinuous phase. A process for preparing the product is also disclosed.

16 Claims, No Drawings

MEAT EMULSON PRODUCT

This is a divisional application of Ser. No. 08/159,989 filed Nov. 30, 1993, now U.S. Pat. No. 5,409,730.

BACKGROUND OF THE INVENTION

The present invention relates to meat products, including ground meat, having enhanced flavor delivery while still retaining highly desirable appearance, taste and cooking performance characteristics, and to a method of making these products.

The prior art has adopted a number of approaches to improve the acceptability of selected meat products, for example, attempts have been made to reduce the fat and cholesterol content of prepared meat products. One such approach is found in U.S. Pat. No. 3,023,104 wherein the desired results are obtained by simply extending conventional products through the addition of crystallite aggregates of cellulose. The cellulose is inert and so the resulting product has less of each ingredient than the natural product. U.S. Pat. No. 4,504,515, in another approach, prepares low-fat meat products by combining high levels of skimmed milk or whole milk with comminuted lean meat. A low cholesterol sausage analog of the ground meat type using egg white as the heat denaturable binder system is described in U.S. Pat. No. 4,376,134. A bacon analogue is similarly described in U.S. Pat. No. 4,143,164. U.S. Pat. No. 4,132,810 also deals with simulated bacon. U.S. Pat. Nos. 4,089,981 and 4,844,922 deal with simulated products containing gelling agents.

Other attempts have been made to prepare low fat products utilizing technology which forces meat protein to bind increased quantities of water or which entail the use of cereal protein and/or carbohydrates and other carbohydrate hydrocolloid to act as agents which bind larger quantities of water in the product. The resulting products generally have an unacceptable texture and taste, being either overly wet or mealy in nature. U.S. Pat. Nos. 5,151,290 and 4,943,445 deal with edible dispersions, used as spreads, containing various gelling agents.

The reduction of fat and cholesterol without concomitant substantial sacrifice in the texture and flavor quality is described in commonly owned U.S. Pat. No. 4,904,496 hereby incorporated by reference herein.

SUMMARY OF THE INVENTION

It has now been found that a flavor enhanced meat product of excellent eating qualities is provided by preparing a continuous phase of heat settable lean meat protein containing a discontinuous phase which in turn comprises particles of a water-in-oil emulsion. The continuous phase of the water-in-oil emulsion is an edible fat, and the discontinuous phase is a gelling solution. In appropriate circumstances, the water-in-oil emulsion can be employed as a stand alone product. This product Can be stored and used at a later time to prepare final meat products. The gelling solution in the water-in-oil emulsion may be an aqueous solution of a hydrocolloid or gelatin or thickener or mixture of these, optionally containing selected flavoring agents or salts such as, for example, sodium or potassium chloride, or selected phosphates. The products of the present invention may also be lowered fat, lowered cholesterol meat products having fat contents in the range of 5% to 40%.

The major portion of the fat is dispersed throughout the lean meat as droplets of water-in-oil emulsion. The discontinuous phase of this water-in-oil emulsion is preferably an immobilized aqueous gelled solution containing, if desired, salts and/or flavorants present at a level of about 0.1% to 8%.

The immobilized aqueous phase may serve as an encapsulating agent for the dissolved salt or flavoring agent which can then be delivered directly to the taste receptors on the tongue during mastication. At the same time, because the aqueous phase portion of the discontinuous phase is most evident to the tongue during eating, the products of this invention achieve enhancement of the normal meat flavors released during the mastication process even without added salt or flavor enhancers.

It has been further found that during the manufacture of these meat products that the grinding/mixing process may, if desired, release soluble myosin into the continuous heat settable protein phase which in turn encapsulates the discontinuous water-in-oil phase producing stable fat containing droplets throughout the continuous phase. The formation of this duplex type of emulsion can prevent weepage of either fat or the internally gelled aqueous phase from the product. The formation of such a stable duplex emulsion also ensures that the product upon cook-up remains juicy, moist and succulent and has a cooked texture resembling a product containing higher fat. The product also has less shrinkage upon cook-up than is normally exhibited by low fat products.

It has further been found that the highly desirable products of the present invention may be provided by a method which includes the steps of:

(a) forming a water-in-oil emulsion by forming an aqueous gelled solution containing gelatin or other hydrocolloid. Salt or another flavoring ingredient may be added if desired at a concentration up to about 8%. If salt or other flavoring ingredient is used it will be used in an amount sufficient to produce a desirable organoleptic effect and thus enhance the flavor of the product. In practice this amount is usually about 0.1% to about 2.5%. The gelatin or other hydrocolloid concentration is sufficient to form a stable gelled aqueous phase at 59° F. The gelling solution is then combined with an edible fat to form the water-in-oil emulsion, (b) forming a ground lean meat phase of high protein content and good binding capacity, (c) dispersing droplets of the water-in-oil emulsion formed in step (a) substantially evenly throughout the lean meat phase of step (b) and (d) grinding the mixture to optionally release myosin from the lean meat phase to set up a duplex emulsion, alternatively if the myosin is not released a satisfactory mixture may also result.

In accordance with this invention, it is preferred that the fat content of the product be in the range of 5% to 40% by weight, and that a major portion of the fat be supplied by the water-in-oil emulsion formed in step (a). It is further preferred that the lean meat of step (b) and the water-in-oil emulsion of step (a) be combined in the relative proportion, by weight, of 9 to 1, however, a broader range of proportions, e.g., about 1.5 to 1, to about 9 to 1 may be used. The meat product is induced to set by heating, either by the producer or consumer, but the product of this invention preferably is heat settable.

DETAILED DESCRIPTION OF THE INVENTION

The products with which the present invention is concerned are meat products which may contain a substantial level of fat in order to obtain desired eating characteristics. Examples of such products include ground meat products such as ground chopped meats for use in hamburgers, meat loaf and meat patties; sausage and sausage patties, breakfast sausage; Italian sausage; luncheon meats such as salami; and emulsion based sausages. This invention will be further described in terms of ground meat products, such as hamburgers, meat patties, breakfast sausage, sausage, and sausage patties, but it is understood to apply to all products of the type described above.

In the embodiment of this invention, the first step in the process involves the preparation of a water-in-oil emulsion which utilizes a fat as a continuous phase, and a gelled aqueous solution containing gelatin or other hydrocolloid or a mixture of these. As mentioned above this emulsion may be used as a stand alone product which can be stored and ultimately used to form a final meat product. Optionally, salt or other flavoring agent may be used. This gelled solution is a discontinuous aqueous phase in the emulsion. The gelatin or hydrocolloid stabilizes the emulsion while entraining, if present, the salt or other flavoring ingredient, and where the products are eaten cold, will have the same taste and textural impression as given by fat. Both gelatin and the operable hydrocolloids of the invention and food grade fats melt on the tongue at roughly comparable temperatures thus allowing the entrained salt or other flavoring agent to be delivered directly to the taste receptors as a burst at the melt temperature of the gelled aqueous phase.

It is preferred that sufficient gelatin or other hydrocolloid be present to ensure that the emulsion droplets contain a gelled aqueous phase at room temperature below 70° F. to 75° F. Thus, the gelatin present in the edible aqueous phase should be in an amount higher than the minimum necessary to form a gelled solution at the solidification temperature of the fat phase. On the other hand, too high a level of gelatin will result in a tough, rubbery product which will not fully melt on the tongue at room temperature. The amount of gelatin used will depend on the Bloom value. Higher Bloom values produce higher gel strengths with less gelatin. The precise amount of gelatin is not critical, and in the usual case, depending on the Bloom value, amounts ranging from 0.5% to 9% by weight of the aqueous phase will be satisfactory. The optimum amount of gelatin is in the range of 2% to 5% by weight of the aqueous phase of the water-in-oil emulsion with a level of 3% on the same basis being preferred. It is noted that the bloom value of the gelatin used can vary; good results are obtained using pork skin gelatin, type A, with a Bloom value of about 90 to 300. Beef bone gelatin of the same bloom value range is also suitable. Hydrocolloids such as carrageenan may also be used. Thickeners such as starch, xanthan gum, locust bean gum, guar gum and mixtures of these may be used. Generally, any hydrocolloid which will form a gel or thickened solution and contribute to the structure but melts at about body temperature will be appropriate.

The gelatin or hydrocolloid solution is prepared by dissolving the gelatin or other hydrocolloid in water at elevated temperature. Normally, the powdered material is added to cold tap water. The amount of water used is typically 40% of the total added water. This mixture is allowed to stand until the gelatin or hydrocolloid is wetted out and fully expands. Although not necessary, it is preferred, for reasons of microbiological stability and in some cases, the enhancement of flavor impact, for the gelatin solution to contain salt and if desired, other flavoring agents such as monosodium glutamate (MSG), ribotide spices, spice extracts, HVP, sugar and specific flavorants such as Bar-B-Q, grill and the like.

Accordingly, if desired, sodium chloride may be added to the wetted gelatin/hydrocolloid solution at this stage at a level of 0.1% to 8% by weight, preferably a level of 2% by weight of the aqueous solution. The remaining water is added to the mixture, which is then heated to solubilize the gelatin/hydrocolloid usually about 115° F. to 120° F. for gelatin and stirred until all the gelatin/hydrocolloid and salt, if used, has been dissolved and the optional flavoring agent, if any, dispersed. The solution can then, if desired, be pasteurized. Volatile flavoring agents such as beef flavor will usually be added after pasteurization unless a closed system is employed. Higher temperatures to prepare the gelling solution may be used for other hydrocolloids, gellan gum requiring about 160° F. and certain starches 150° F. to 185° F., The temperature of the solution is reduced under agitation to 75° F. to 95° F., preferably 80° F., Agitation prevents the solution from gelling and makes it available for the production of the water-in-oil emulsion.

The fat component of the water-in-oil emulsion phase may be any edible fat compatible with the processed meat being produced including vegetable fat or oil, or hydrogenated fish oil, if desired. The principal source of the fat is usually trimmings off the carcass and these trimmings can have a fat content ranging from 50% to 100%. The amount of non-fat material present is limited to that amount which will still allow the oil-in-water emulsion to form. This, of course, depends on the type of fat and non-fat material. As a practical source, trimmings of 50% lean/50% fat to 15% lean/85% fat from either beef or pork are used as they are standard articles of commerce.

The meat trimmings used as a source of fat are initially ground, for example, through a ¼ to ½ inch grinding plate, at 38° F. to 45° F. The ground trimmings are then comminuted in a high speed blender, such as a Stephen Vertical-Cutter/Mixer model VTC400 operated at either 1800 or 3600 rpm. Intermediate ranges are of course permissible. Fat-rich beef trimmings are typically comminuted at 3600 rpm at a temperature of 66° F. to 70° F. until a creamy, plastic, fat continuous phase has been established. Fat-rich pork trimmings, on the other hand, are typically comminuted at 1800 rpm at a temperature of 55° F. to 57° F. To ensure that a continuous fat phase has been achieved, conductivity of the phase is tested, with a conductivity of 0 to 15 mhos being indicative of a continuous fat phase.

The water-in-oil emulsion is next prepared by combining the gelatin or hydrocolloid solution with the comminuted fat-rich meat trimmings. The solution may be added to a Stephen Vertical-Cutter/Mixer at a steady rate, while the mixture is being comminuted at 1800 rpm. The temperature of the gelatin hydrocolloid solution when added is preferably at 75° F. to 80° F. After all the solution has been added, comminution continues until the temperature reaches 84° F. to 88° F. for beef and 77° F. to 81° F. for pork.

The formation of a stable water-in-oil emulsion, is confirmed by conductivity measurement and microscopic examination. The emulsion is discharged from the Stephen Vertical-Cutter/Mixer and its temperature lowered to allow the fat to solidify and the aqueous gelatin hydrocolloid phase to reach a gelled state. Generally, the temperature is lowered to 20° F. to 30° F. Preferably the material is frozen which may be accomplished by any convenient method. The important restriction here is that the tempering and how it is done does not break the emulsion.

Other suitable edible; fats which may be used in the practice of this invention include various animal and vegetable fats and hydrogenated fish oil. The water-in-oil emulsion can be made using solid vegetable shortening or combinations of vegetable shortenings and chicken fat.

In the final emulsion state, a finely dispersed aqueous phase comprising 0.5% to 9% gelatin or hydrocolloid, up to 8% salt or other flavorant, and some of the soluble protein from the lean phase of the fat-rich trimmings is uniformly surrounded by a fat coating. The final composition is variable based on the proportions of starting ingredients and the fat content. A high fat content will result in a low moisture content while a low fat content will result in a higher moisture content. The aggregation of these finely dispersed emulsion droplets produces a continuous fat phase. The solidification of the fat phase and the gelling of the aqueous phase produces a stable emulsion, which to the tongue is perceived as only fat. The latent heat of the tongue is sufficient to melt the fat coating and the gelled aqueous phase while maintaining the perception of only fat. The melting of this emulsion directly releases the salt or flavoring solution to the taste receptors enhancing taste perception.

In accordance with the second stage of preparing products of this invention, a lean meat of high protein content and good binding capacity is prepared using any of several prior art procedures. Chunks of meat such as bull meat, boneless primal cuts of cattle, hogs, veal, sheep, as well as chicken or turkey, or other cuts or mixtures thereof, may be employed. In accordance with one preferred embodiment, beef or pork trimmings having 78–92% lean meat, with the balance fat, are coarse ground at 36° F. to 42° F. through a ½ to 1 inch plate in a Wolfking grinder. Liquid or solid carbon dioxide is employed to ensure that the meat stays in the temperature range cited.

In a like manner, the frozen water-in-oil emulsion is similarly coarse ground under the conditions cited above. Preferably at 10° F. to 30° F. the coarsely ground water-in-oil emulsion and the coarsely ground high protein content meat are combined in proportions sufficient to provide a final ground meat product where the water-in-oil emulsion represents from 3% to 30% of the formula content of the finished product. The resulting blend is then preferably ground to its final particle size through a ⅛ to ¼ inch plate. The ground meat mixture is then made into patties or shaped into final sausage products. While sufficient shear may be imposed on the mixture to provide myosin this is, by no means, critical to the final product as satisfactory products also result without producing substantial quantities of myosin.

The patties or sausages made by this process can be either frozen directly or precooked for delivery to the end user. It is noted that the process of this invention, upon cooking of the patty or sausage provides for more juiciness and less product shrinkage with an enhanced meat taste.

All parts and proportions herein are by weight unless otherwise indicated.

The invention will be further described in the following examples.

EXAMPLE 1

Procedure for Making Water-in-Oil Emulsions

A. Preparation of beef water-in-oil emulsions

An aqueous gelatin solution containing 3% by weight of 100 bloom beef bone type A gelatin is prepared by first prewetting the gelatin in ⅓ of the total water to be added. The temperature is 55° F. Upon complete swelling of the gelatin, salt (sodium chloride) at a level of 2% by weight of the aqueous solution is added. The remaining Water is added at a temperature of 150° F. The components are fully dissolved by agitation, and the solution is then brought to 150° F. for a period of 15 minutes and then cooled down.

Beef trimmings containing 70% fat and 30% lean meat are ground by passage through a ¼ inch grinding plate using a Wolfking mixer/grinder equipped with a sinew and bone eliminator. The ground trimmings are then placed in a Stephen Vertical. Cutter/Mixer, Model VTC400, made by the Stephen Food Technology Corp. of Germany. The Stephen Cutter is operated at 3600 rpm for 4 to 7 minutes, raising the temperature of the ground trimmings prepared above to 66° F.–70° F. The comminuted fat rich meat has a creamy, plastic appearance, and when conductivity is measured, no conductivity will be found.

The aqueous gelatin solution, prepared above is cooled to a temperature of 75° F.–80° F. and then added at a constant rate to the Stephen Cutter and combined with the comminuted trimmings in the proportions by weight of 60% aqueous gelatin solution and 40% of the comminuted trimmings. The cutter/mixer is operated at 1800 rpm during this addition for a period of 4 to 6 minutes. This time will depend upon the amount of gelatin solution to be added. After the addition of all the gelatin solution, the cutter/mixer is allowed to run at 1800 rpm until the temperature of the product reaches 84° F.–88° F. A smooth, creamy white product is obtained. This product, under microscopic examination and conductivity measurements reading 0.00 mho, is confirmed to be a water-in-oil emulsion.

The product is discharged from the mixer/cutter and packaged. The product may be placed into casing employing a VEMAG meat stuffer, and then frozen by passing the stuffed casing through a glycol bath. If the product were to be boxed it would be frozen by placing the material in a blast freezer.

The water-in-oil emulsion has the following analysis:

| | |
|---|---|
| Protein | 5.17% |
| Moisture | 64.94% |
| Fat | 28.60% |
| Salt | 1.29% |

B. Preparation of pork water-in-oil emulsions

An aqueous gelatin solution containing 3% by weight of 95 bloom pork skin type A gelatin is prepared by first prewetting the gelatin in ⅓ of the total water to be added. The temperature is 55° F. Upon complete swelling of the gelatin, salt (sodium chloride) at a level of 2% by weight of the aqueous solution is added. The remaining water is added at a temperature of 150° F. The components are fully dissolved by agitation, and the solution is then brought to 150° F. for a period of 15 minutes and cooled dawn.

Pork trimmings containing 55%–61% fat (the optimum fat concentration for the pork is 58%) and lean meat are ground by passage through a ¼ inch grinding plate using a Wolfking mixer/grinder equipped with a sinew and bone eliminator. The ground trimmings are then placed in a Stephen Vertical-Cutter/Mixer, Model VTC400.The Stephen Cutter is operated at 1800 rpm for 3 to 5 minutes, raising the temperature of the ground trimmings prepared above to between 55° F.–57° F. The comminuted fat rich meat has a creamy, plastic appearance, and when conductivity is measured, no conductivity will be found.

The aqueous gelatin solution, prepared above is cooled to a temperature of 75° F.–80° F. and then added at a constant rate to the Stephen Cutter and combined with the comminuted trimmings in the proportion by weight of 51.6% aqueous gelatin solution and 48.4% of the comminuted trimmings. The cutter/mixer is operated at 1800 rpm during this addition for a period of 4 to 6 minutes. This time will depend upon the amount of gelatin solution to be added. After the addition of all the gelatin solution, the cutter/mixer is allowed to run at 1800 rpm until the temperature of the product reaches 77° F.–81° F. A smooth, creamy white product is obtained which, under microscopic examination and conductivity measurements reading 0.00 mho, is confirmed to be a water-in-oil emulsion.

The product is discharged from the mixer/cutter and packaged off either into boxes or casing for further use. Product placed into casing employs a VEMAG meat stuffer, and is then frozen by passing the casing through a glycol bath. Boxed product is frozen by placing the material in a blast freezer.

The water-in-oil emulsion has the following analysis:

| | |
|---|---|
| Protein | 6.03% |
| Moisture | 65.45% |
| Fat | 28.24% |
| Salt | 1.30% |

EXAMPLE 2

Preparation and Evaluation of Ground Beef Patties

The beef water-in-oil emulsion prepared in Example 1 is used to prepare ground beef patties. The emulsion is frozen and ground through a ½ inch plate. Combinations of beef trimmings are used to prepare a final patty. The designation of the beef trimmings varies depending on the amount of lean beef, for example, 93% lean beef and 75% lean beef are used in the Sample A control. The lean beef trimmings are ground through a ½ inch plate at a temperature of 38° F. The weight percentage of the designated lean beef in each patty and the weight percentage of the beef, water-in-oil emulsions are listed below for the various comparisons made:

| SAMPLE A. 10% FAT CONTENT BEEF PATTIES | | | |
|---|---|---|---|
| CONTROL | | INVENTIVE PATTY WITH BEEF WATER-IN-OIL EMULSION | |
| DESIGNATION | WT. % | DESIGNATION | WT. % |
| 93% Lean Beef | 83.1% | 93% Lean Beef | 85.7% |
| 75% Lean Beef | 16.9% | Emulsion (fat content ≈ 28%) | 14.3 |

| SAMPLE B. 22% FAT CONTENT BEEF PATTIES | | | |
|---|---|---|---|
| CONTROL | | INVENTIVE PATTY WITH BEEF WATER-IN-OIL EMULSION | |
| DESIGNATION | WT. % | DESIGNATION | WT. % |
| 91% Lean Beef | 20% | 91% Lean Beef | 55% |
| 75% Lean Beef | 80% | 75% Lean Beef | 25% |
| | | Emulsion (fat content ≈ 28%) | 20% |

The mixtures of meats are blended in a ribbon mixer, and then ground through a 5/32 inch plate at a final temperature of 43° F. The ground meats are formed into 3.8 ounce patties on a Hollymatic.

The formed patties are weighed to provide side by side cooking comparisons. The patties are cooked for 2 minutes on each side on a flat grill preheated to 350° F., which ensures an internal cook temperature of 150° F. The cooked patties are evaluated for shrink (weight loss during cooking), juiciness, texture and flavor.

Upon evaluation the products made with the water-in-oil emulsion are found to be of comparable texture to the control, with greater juiciness and more meat flavor. For the 10% fat: content patties, the control exhibits a cook yield of 86.3% while the water-in-oil emulsion containing patties show a cook yield of 90.1%. Likewise, the cook yields for the 22% fat products are 79.7% for the control and 83.7% for the water-in-oil emulsion containing patties.

EXAMPLE 3

Preparation and Evaluation of Ground Pork Patties

The pork water-in-oil emulsion prepared in Example 1 is used to prepare ground pork patties. The emulsion is ground frozen through a ½ inch plate. As in Example 2, combinations of lean pork trimmings are used to prepare the final patty. The designation of the pork trimmings varies depending on the amount of lean pork. The lean pork trimmings are ground through a ½ inch plate at a temperature of 38° F. The weight percentage of the designated lean pork in each patty and the weight percentage of the pork water-in-oil emulsions are listed below for the various comparisons made:

| SAMPLE C. 10% FAT CONTENT PORK PATTIES | | | |
|---|---|---|---|
| CONTROL | | INVENTIVE PATTY WITH PORK WATER-IN-OIL EMULSION | |
| DESIGNATION | WT. % | DESIGNATION | WT. % |
| 94% Lean Pork | 90% | 94% Lean Pork | 80% |
| 64% Lean Pork | 10% | Emulsion (fat content ≈ 28%) | 20% |

| SAMPLE D. 15% FAT CONTENT PORK PATTIES | | | |
|---|---|---|---|
| CONTROL | | INVENTIVE PATTY WITH PORK WATER-IN-OIL EMULSION | |
| DESIGNATION | WT. % | DESIGNATION | WT. % |
| 94% Lean Pork | 70% | 94% Lean Pork | 65% |
| 63% Lean Pork | 30% | 63% Lean Pork | 15% |
| | | Emulsion (fat content ≈ 28%) | 20% |

| SAMPLE E. 37% FAT CONTENT PORK PATTIES | | | |
|---|---|---|---|
| CONTROL | | INVENTIVE PATTY WITH PORK WATER-IN-OIL EMULSION | |
| DESIGNATION | WT. % | DESIGNATION | WT. % |
| 63% Lean Pork | 100% | 63% Lean Pork | 90% |
| | | Emulsion (fat content ≈ 28%) | 10% |

The mixtures of meats are blended in a ribbon mixer, and then ground through a ¼ inch plate at a final temperature of 28° F. The ground meats are formed into 3.8 ounce patties on a Hollymatic, and the composition of the patties is confirmed by analysis.

The formed patties are weighed out for side by side cooking comparisons. The patties are cooked for 3 minutes on each side on a flat grill preheated to 350° F., which ensures an internal cook temperature of 150° F. The cooked patties are evaluated for shrink (weight loss during cooking), juiciness, texture and flavor.

Upon evaluation the products made with the water-in-oil emulsion are found to be of comparable texture to the control, with greater juiciness and more meat flavor. For the 10% fat content patties, the control exhibits a cook yield of 80.3% but a rubbery texture and little taste while the water-in-oil emulsion containing patties show a cook yield of 81.9% with good texture, taste and juiciness. Likewise, the cook yields for the 15% fat products are 74.5% for the control and 78.7% for the water-in-oil emulsion containing patties; for the 37% fat products the cook yields are 60.2% for the control and 66.8% for the water-in-oil emulsion containing patties. All the evaluators, who are trained in meat products, comment that the patties made with the water-in-oil emulsion taste juicier and that the flavor is more pronounced.

EXAMPLE 4

Salami and pepperoni products were prepared by the following procedure:

The beef water-in-oil emulsion prepared as set forth in Example 1 was cut into slabs or disks while still in the frozen state.

In a separate procedure, beef trimmings having 70%–90% lean meat were added to a Laska Bowl Chopper, where they are chopped with sodium chloride, 0.5%–1.0%, sodium nitrite as Prague Powder at 0.25% and sodium erythorbate at 0.0361%, all by weight of the finished product. The mixture was chopped 1–3 minutes at 35° F.–45° F. The frozen water-in-oil emulsion prepared above was added to the chopped mixture at the meat emulsion temperature, seasoning for the particular variety in question was added, and chopping was continued for an additional 1–2 minutes to produce a coarse chopped product. The amount of the water-in-oil emulsion added depended upon the requirement of a full fat or reduced fat product. The coarse chopped, comminuted mixture, salami or pepperoni dependent upon the seasoning used, was then run into the hopper of a continuous stuffing machine. The mixture was stuffed into 78mm synthetic casing and the large links run through a commercial smoke house according to the following approximate schedule: 130° F. for 20 minutes; 150° F. for 30 minutes; and 180° F. until an internal temperature of 150° F. for 30 minutes was attained. The temperature of the smokehouse was then lowered to slowly dry out the product. The product was transferred to a drying room for a period of time sufficient to reduce the moisture content of the product and reduce the moisture activity below 0.7.

Upon evaluation, the salami and pepperoni produced by this procedure were found to be of high quality, being succulent and having excellent taste, texture and appearance. Products so produced could not be distinguished from control products made from the normal level of 2.0%–2.5% sodium chloride in the starting emulsion, even though the finished products have a substantially reduced salt content.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A ground or chopped meat product comprising:
   (i) a continuous phase of heat settable meat protein;
   (ii) a discontinuous phase dispersed in said continuous phase, said discontinuous phase having been dispersed in said continuous phase at a temperature of 10° F. to 30° F., comprising particles of a hardened water-in-oil emulsion having:
      (a) a continuous phase of edible fat; and
      (b) a discontinuous phase of an aqueous gelled solution, said solution having dissolved or dispersed therein a flavoring agent, whereby said flavoring agent is delivered directly to the taste receptors on the tongue during mastication to enhance the flavor perception of said agent.

2. The product as defined in claim 1 containing 5% to 40% fat.

3. The product as defined in claim 1 wherein said aqueous gelled solution contains as the gelling agent 0.5% to 9%, by weight of the aqueous gelled solution, of an agent selected from the group consisting of gelatin, pectin, carrageenan, gellan and mixtures thereof.

4. The product as defined in claim 3 wherein said aqueous gelled solution contains 0.1% to 8%, by weight of the aqueous solution, of a salt selected from the group consisting of sodium chloride, potassium chloride, sodium phosphate, potassium phosphate and mixtures thereof.

5. The product as defined in claim 1 wherein the aqueous gelled solution contains gelatin having a Bloom strength of 90 to 300.

6. The product of claim 1 in the form of ground beef.

7. The product of claim 1 in the form of salami or pepperoni.

8. The product of claim 1 in the form of ground pork sausage patties.

9. A ground or chopped meat product containing 5% to 40% fat, comprising:
   (i) a continuous phase of heat settable meat protein containing 60% to 95% of lean meat and 5% to 40% of fat;
   (ii) a discontinuous phase of a hardened water-in-oil emulsion dispersed in said continuous phase, said discontinuous phase having been dispersed in said continuous phase at a temperature of 10° F. to 30° F. and said discontinuous phase containing 20% to 40% fat by weight of said discontinuous phase, said water-in-oil emulsion having:
      (a) a continuous phase of said fat and a conductivity of 0.00 to 15.0 mho; and
      (b) a discontinuous phase, dispersed in said continuous phase of said fat, of an aqueous gelled solution, said solution having dissolved or dispersed therein a flavoring agent, whereby said flavoring agent is delivered directly to the taste receptors on the tongue during mastication to enhance the flavor perception of said agent.

10. The product as defined in claim 9 wherein said aqueous gelled solution contains as the gelling agent 0.5% to 9%, by weight of the aqueous gelled solution, of an agent selected from the group consisting of gelatin, pectin, carrageenan, gellan and mixtures thereof.

11. The product as defined in claim 10 wherein said aqueous gelled solution contains about 0.1% to 8%, by weight of the aqueous solution, of a salt selected from the group consisting of sodium chloride, potassium chloride, sodium phosphate, potassium phosphate and mixtures thereof.

12. The product of claim 9 in the form of ground beef.

13. The product of claim 9 in the form of salami or pepperoni.

14. The product of claim 9 in the form of ground pork sausage patties.

15. A ground or chopped meat product prepared by a process for preventing excessive cooking yield loss and enhancing the flavor of said product by lowering the concentration of auxiliary ingredients necessary to obtain a perceived flavor change in said product after cooking, said process comprising:

(a) comminuting lean meat to prepare a lean meat mixture and to form a continuous heat-settable phase;

(b) adjusting the temperature of said lean meat mixture to 30° F. to 40° F.;

(c) preparing a water-in-oil emulsion having a continuous phase containing edible fat and a discontinuous aqueous phase containing a gelling agent, said aqueous phase having dissolved or dispersed therein a flavoring agent;

(d) hardening said water-in-oil emulsion by reducing the temperature to 20° F. to 30° F.; and (e) mixing the lean meat mixture of (b) and the hardened emulsion of (d) at a temperature of 10° F. to 30° F. to produce said ground or chopped meat product whereby said flavoring agent is delivered directly to the taste receptors on the tongue during mastication to enhance the; flavor perception of said agent.

16. The meat product as defined in claim 15 wherein said hardened water-in-oil emulsion is prepared by:

(i) forming an aqueous solution or dispersion of:
  (a) gelling agents selected from the group consisting of gelatin, carrageenan, gellan, pectin and mixtures thereof;
  (b) optional thickening agents selected, from the group consisting of starch, xanthan gum, locust bean gum, guar gum and mixtures thereof;
  (c) flavorants add flavor enhancers selected from the group consisting of sodium chloride, potassium chloride, sodium phosphate, potassium phosphate, monosodium glutamate, ribotide, spices, spice extracts, hydrolyzed vegetable protein (HVP), sugar, specific flavorants and mixtures thereof to allow said flavorants and flavor enhancers to be delivered directly to the taste receptors on the tongue during mastication thereby enhancing the flavor perception of said flavorants and said flavor enhancers;
  (d) optional emulsifiers;

(ii) optionally pasteurizing the solution;

(iii) tempering the solution to 75° F.–85° F. with mixing and holding for future use;

(iv) preparing at a temperature of about 38° F. to 45° F. an edible fat component containing 50% to 100% fat by;
  (a) grinding and tempering meat trimmings to reduce the particle size thereof;
  (b) further reducing the particle size of said meat trimmings by high shear cutting combined with temperature control to form a creamy, continuous plastic fat phase having a conductivity of 0.00 to 15.0 mho, wherein the temperature of said meat trimmings is dependent on the type of meat, the temperature for pork being controlled at a temperature of 55° F. to 65° F. and the temperature beef being controlled at a temperature of 50° F. to 70° F.;

(v) combining the aqueous solution or dispersion with the fat continuous plastic phase by shearing the fat continuous plastic phase and slowly adding the aqueous solution or dispersion while keeping the temperature thereof below about 95° F. to form a water-in-oil emulsion; and then (vi) lowering the temperature of said emulsion to 20° F.–30° F. to solidify the fat and gel the gellable portion of the aqueous solution or dispersion.

* * * * *